United States Patent [19]
Johnston

[11] Patent Number: 5,610,912
[45] Date of Patent: Mar. 11, 1997

[54] SWITCHING IN A TELECOMMUNICATIONS SERVICE NODE

[75] Inventor: John G. Johnston, Ipswich, England

[73] Assignee: British Telecommunications public limited company, London, England

[21] Appl. No.: 310,023

[22] Filed: Sep. 22, 1994

[30] Foreign Application Priority Data

Aug. 1, 1994 [EP] European Pat. Off. ............. 94305681

[51] Int. Cl.$^6$ .................................................. H04Q 11/04
[52] U.S. Cl. ............................. 370/359; 370/360; 379/94
[58] Field of Search ..................... 370/58.1, 58.2, 370/58.3, 85.1, 85.13, 56, 79, 94.3

[56] References Cited

U.S. PATENT DOCUMENTS

| | | | |
|---|---|---|---|
| 4,127,742 | 11/1978 | Couturier et al. ........................ | 178/18 |
| 4,905,222 | 2/1990 | Seeger et al. ........................... | 370/58.1 |
| 5,278,892 | 1/1994 | Bolliger et al. ......................... | 370/58.1 |
| 5,291,479 | 3/1994 | Vaziri et al. ............................ | 370/58.2 |
| 5,313,459 | 5/1994 | Matern ................................... | 370/58.1 |
| 5,392,278 | 2/1995 | Teel et al. .............................. | 370/58.3 |
| 5,450,486 | 9/1995 | Maas et al. ............................. | 370/58.1 |

FOREIGN PATENT DOCUMENTS

| | | | |
|---|---|---|---|
| 0016426 | 10/1980 | European Pat. Off. ....... | H04Q 11/04 |
| 0539755A2 | 5/1993 | European Pat. Off. ....... | H04Q 11/04 |
| 2186762 | 8/1987 | United Kingdom ........... | H04Q 11/04 |
| 2200816 | 8/1988 | United Kingdom ........... | H04Q 11/04 |

*Primary Examiner*—Douglas W. Olms
*Assistant Examiner*—Shick Hom
*Attorney, Agent, or Firm*—Nixon & Vanderhye P.C.

[57] ABSTRACT

A switch (25) for a service node (18) forming part of a telecommunications network (FIG. 1), having a switching matrix (32) and a plurality of line interface circuits (37). Each of the line interface circuits (37) includes a cross-point switch (47), a plurality of a first type of processing devices (such as digital signal processors 52) and a second type of processing devices, such as a microprocessor (38). The digital signal processors are connected to the cross-point switch (47) by a serial interface (56) suitable for receiving digitized speech signals. The microprocessor is connected to the cross-point switch via a parallel bus (57) and the cross-point switch includes devices for facilitating a communication between the digital signal processor and the cross-point switch.

20 Claims, 7 Drawing Sheets

1

SWITCHING IN A TELECOMMUNICATIONS SERVICE NODE

FIELD OF THE INVENTION

The present invention relates to a service node connectable to a telephony network, in which a plurality of peripheral devices are provided, along with switching means for connecting said peripheral devices to external communication means under the control of control processing means.

BACKGROUND OF THE INVENTION

Over recent years, telephony networks have become more sophisticated and it has become possible for an increasing number of services to be provided, in addition to the fundamental provision of allowing a first customer Lo be connected to a second customer.

Telephony systems of this type are often referred to as intelligent networks, and provide such services as automatic call distribution, store and forward, fax to speech, call queuing, voice menu systems, call diversion, follow-on and voice prompts, etc.

Service nodes are units within the network where intelligent services are concentrated and made available to customers connected to the network via switching mechanisms provided within the network. At the node itself, a large switching device is provided which allows customer calls to be connected to peripheral devices under the control of central control processing means, such as a mini or mainframe computer. In known systems, it is necessary for the control computer to analyse signals generated by calling customers, in order that peripheral devices may be connected and, as necessary, disconnected etc. Thus, once a particular service has been established, this is generally driven under the control of a particular peripheral device. However, it is necessary for the central control computer to observe the operation of a connection between peripheral devices and external lines, in order to ensure that the integrity of the overall network is maintained.

A problem with known service nodes is that it is desirable to have large switches at the nodes, so that maximum benefit may be gained from a large number of shared services. However, as the number of shared services increases, with a resulting increase in the size of the connecting switch, the size and power of the control computer must also increase, along with the bandwidth of the communicating link between the computer and the switch.

SUMMARY OF THE INVENTION

According to a first aspect of the present invention, there is provided a service node switching apparatus for routing channels within a service node, comprising a switching matrix and a plurality of line interface means, characterised in that each of said line interface means includes: a cross-point switch, a plurality of a first type of processing means and a second type of processing means, wherein; said first type of processing means is connected to said cross-point switch by a first type of interface means, said second type of processing means is connected to said cross-point switch by a second type of interface means, and said cross-point switch includes means for facilitating a communication between said first type of interface means and said second type of interface means.

In a preferred embodiment, the cross-point switch is configurable by one of said distributed processing means, which may be said second type of processing means, with said configuration being achieved via said second interface means. Preferably, said first type of processing means is programmable by said second type of processing means. In a preferred embodiment, the first type of processing means is arranged to receive a program directly from said second type of processing means, thereby avoiding said cross-point switch.

According to a second aspect of the present invention, there is provided a method of processing signals in a line interface card for a service node switch, characterised by supplying program instructions to a first type of processing means from a second type of processing means via a first type of interface; and communicating data between said first type of processing means and said second type of processing means via a cross-point switch, wherein said first processing means communicates with said cross-point switch over a second interface and said second processing means communicates with said cross-point switch via said first interface.

BRIEF DESCRIPTION OF THE DRAWINGS

The invention will now be described by way of example only, with reference to the accompanying drawings, in which.

DETAILED DESCRIPTION OF THE DRAWINGS

Figure 1:
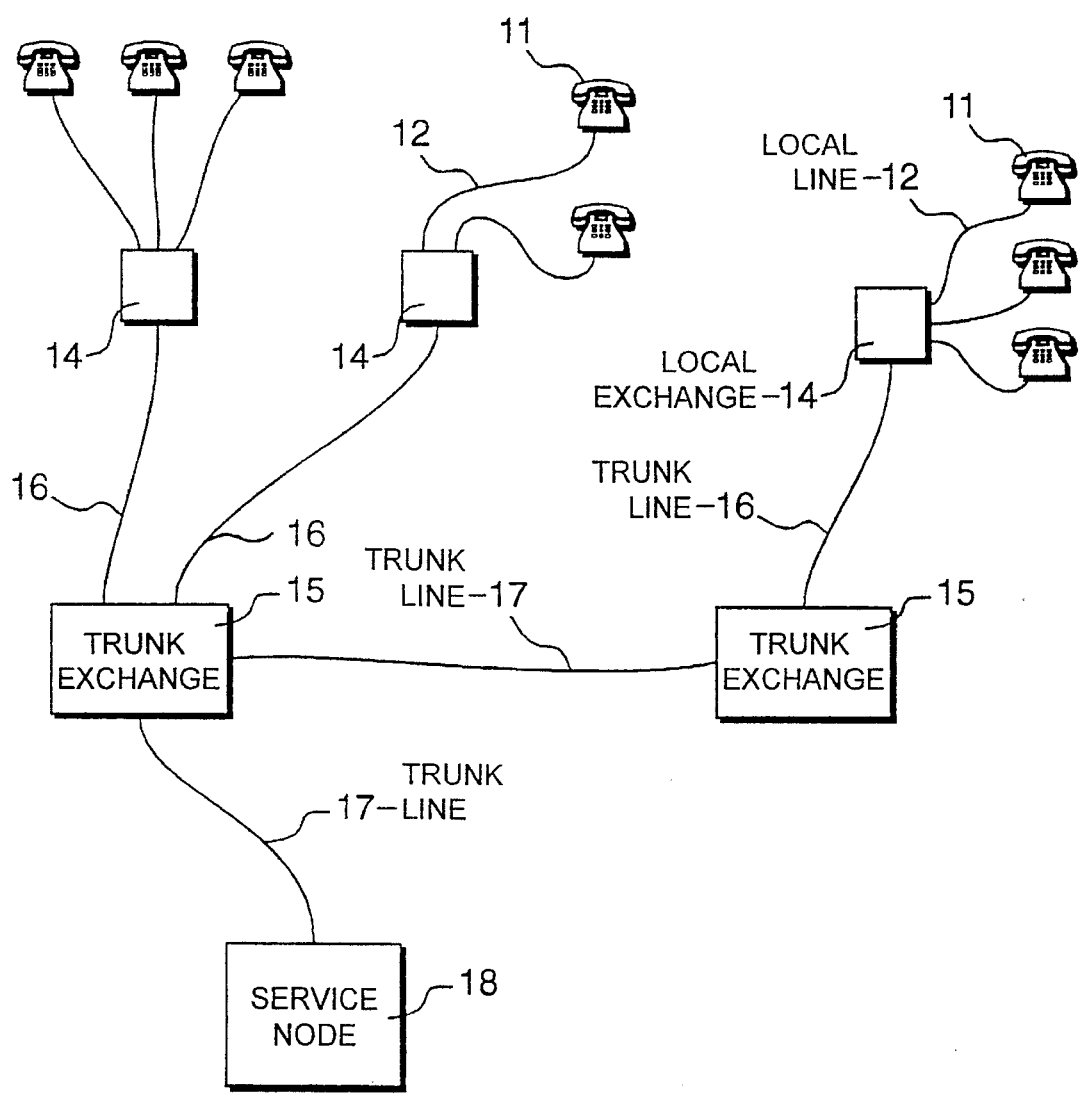
FIG. 1 shows a public switched telephony network, including a plurality of customer terminal equipment, local exchanges, trunk exchanges and a service node.

A telephony network is illustrated in FIG. 1, including a plurality of customer terminal equipment 11, including telephones and fax machines etc. Each customer terminal equipment 11 is connected via a local line 12 to a local exchange 14, thereby providing by-directional communication between the terminal equipment and the local exchanges.

Local exchanges 14 are connected to trunk exchanges 15 and bi-directional communication between said exchanges is effected over trunk cables 16. Similarly, trunk exchanges are bi-directionally connected by trunk lines 17, again arranged to convey multiplexed signals.

In the preferred network, conversion between analogue signals and digital signals occurs at the local exchanges 14 and communication throughout the trunk network is performed in the digital domain. Thus, each trunk line 16 includes physical communication links each arranged to convey 30 speech channels over a 2 megabit per second multiplex. In addition, higher levels of multiplexing may be achieved using optical links, which are particularly suitable for connecting trunk exchanges 15.

In addition to allowing conventional telephone connections to be made, the network shown in FIG. 1 also includes a plurality of added value services which allow customers to interact via voice menus, receive recorded information from a central source, record messages and receive recorded messages, and establish sophisticated call diversion procedures, wherein, over a day, calls may be diverted to a plurality of numbers, reflecting the location of an actual customer, rather than the terminal equipment. These added value services are located at a central position, in the form of a service node 18. The service node 18 is connected to the rest of the network via a plurality of 2 megabit per second digital links, such that any customer connected to the network may obtain services via the central service node by establishing an appropriate connection through the network of exchanges.

Figure 2:
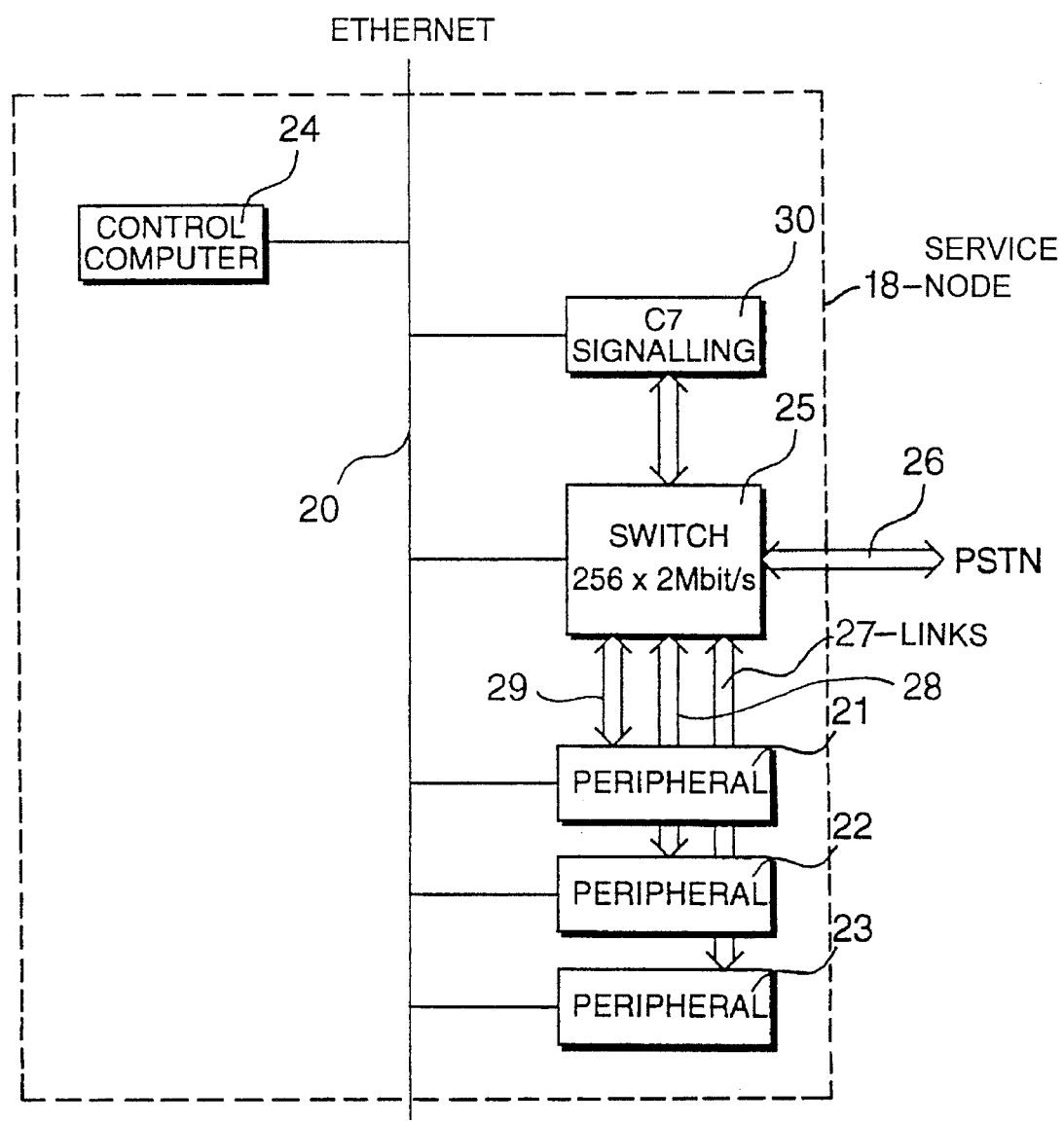
FIG. 2 shows the service node identified in FIG. 1, including a control computer, peripheral devices and a switch for connecting external lines to said peripheral devices.

The service node 18 is detailed in FIG. 2 and comprises a plurality of peripheral devices; three of which are identified by references 21, 22 and 23. Each peripheral device is configured to perform a specific task. Thus, voice menu services may be provided by a speech applications platform, allowing two-way communication using recorded voice messages, voice recognition and DTMF tone recognition.

Another peripheral device may be arranged to supply recorded information to calling customers. A message is recorded centrally on the peripheral and written to randomly accessible memory storage devices.

Thus, the same message may be played to a plurality of calling customers and by addressing the memory devices individually for each call, the message may be played to each calling customer from the beginning of the message, creating the impression that a dedicated message has been recorded for that call.

A third peripheral device may be arranged to record messages left by customers so that they may then be collected by a specific customer for whom the service has been created, effectively providing the customer with the services of a virtual call answering machine. Thus, on receiving instructions from the customer, all of said customers will be directed to the service node such that, under the control of a control computer 24, voice data will be supplied to, say, peripheral 23, whereafter, in response to a call made by the customer, said recorded information may be replayed.

Another service provided by service nodes is that of redirecting calls. Thus, all calls to a particular customer may be directed to the service node and, under the control of the control computer 24, the call is redirected out to a preprogrammed destination. Thus, for each day, a customer may issue programming commands, such that, at predefined points during the day, calls are directed to different numbers, thereby following a customer from location to location.

A switch 25 is provided with 256 multiplex lines. Thus, each of said lines includes two coaxial cables, for bi-directional communication, and each of said coaxial cables is capable of conveying 32 channels, transmitted at 2 megabit per second. Thus, a plurality of coaxial communications are provided to the public switch telephone network, identified generally by reference 26 and other 2 megabit links are supplied to each of the respective peripherals. Thus, in the example shown in FIG. 2, 2 megabit links 27 are connected to peripheral 21, similar links 28 connect peripheral 22, while links 29 connect peripheral 23. Thus, each peripheral 21 to 23 etc. is arranged to receive voice channels in the form of 2 megabit multiplex connections. In addition, the peripherals are arranged to receive control commands from the control computer 24.

Preferably, common channel signalling is used, such as signalling which conforms to the CCITT C7 recommendation and an interface for identifying and generating C7 signalling information is identified in FIG. 2 by reference 30.

The C7 interface 30, the central switch 25, the peripheral devices 21, 22 and 23 communicate with the control computer 24 via an ethernet connection, capable of conveying a data at a burst rate of up to ten megabits a second.

Calls are initiated in response to DTMF tones generated by a customer. In order to establish a call to the service node, signalling commands are transmitted over the common channel, by means of one of the channels forming part of those generally identified by reference 26, which, at switch 25, are directed to the signalling interface 30. The signalling interface 30 instructs the control computer 24, over the ethernet 20, to the effect that a calling customer requires service. The signalling information will identify to the control computer 24 an identification of the actual calling customer and, to some extend, an identification of the number called by said customer. Thus, on the basis of this information, the control computer 24 instructs the switch 25 to connect the call to a specified channel connected to the required peripheral device. In addition, the control computer 24 also instructs the relevant peripheral as to the nature of the service required.

While a customer is making use of a service, it is common practice for the customer to generate signals in a form which is recognisable by the system. These signals may be interpreted by peripheral devices as part of the normal operation of the service. However, in addition, it may also be necessary for customer generated signals to be recognised by the control computer 24, particularly if these relate to customer instructions which effectively terminate a service, such that the control computer is required to instruct switch 25 and the relevant peripheral to the effect that the service has now been terminated and, if required, to allow the customer to make further use of the services available at the node.

In the telephony network illustrated in FIGS. 1 and 2, the service node includes a plurality of peripheral devices in addition to switch 25 for connecting the peripheral devices to external communicating channels 26. In order to establish calls and to monitor signalling while calls are in process, a significant level of processing capacity is required within the node. The service node is therefore provided with a control computer 24 which provides overall control of the system in an hierarchical manner. However, in addition to this, the switch 25 itself includes distributed processing devices which are themselves responsive to externally originating signals, such as DTMF signals generated by customers while calls are in process. Thus, the distributed processing devices are arranged to supply information derived from said signals to the control computer 24. Thus, in this way, it is not necessary for the control computer 24 to scan incoming calls in order to detect customer generated signalling. The detection and identification of signalling commands is made locally at the switch 25 and data is only supplied to the control computer 24 over the ethernet 20, when a customer originating signal has been detected. Thus, the switch 25 includes local processing devices responsive to external signals, such that information derived from said signals may be supplied to the control computer 24, in preference to the signals themselves. Thus, the computer 24 is relieved of the activity of scanning customer originated calls, which provides two significant benefits. Firstly, for a given switch size, less processing capacity is required on the part of the control computer 24. Alternatively, for a given processing capacity present on the control computer 24 a much larger switch may be used. The advantage of that is, for a given size of control computer 24, more central added value services may be included at the node, thereby effectively providing a greater economy of scale. Secondly, given that it is not necessary for scanning to be effected by the control computer 24, communication between the switch 25 and the control computer 24 is significantly reduced. Consequently, far less band width is required on the part of communication channels connecting control computer 24 and the switch 25 which, in this example, is effected by means of an Ethernet. Thus, as can readily be appreciated, the level of band width available on the ethernet is significantly less than the level of band width employed to effect communication between the PSTN and the peripheral devices, via the switch 25.

Switch 25 is housed within an EMC 19" shielded rack, which stands 2 meters high and contains a total of seven shelves. One of these shelves is used to house power supply units for the Ethernet transceivers, while the remaining six shelves are provided for component cards of the switch itself.

Figure 3:
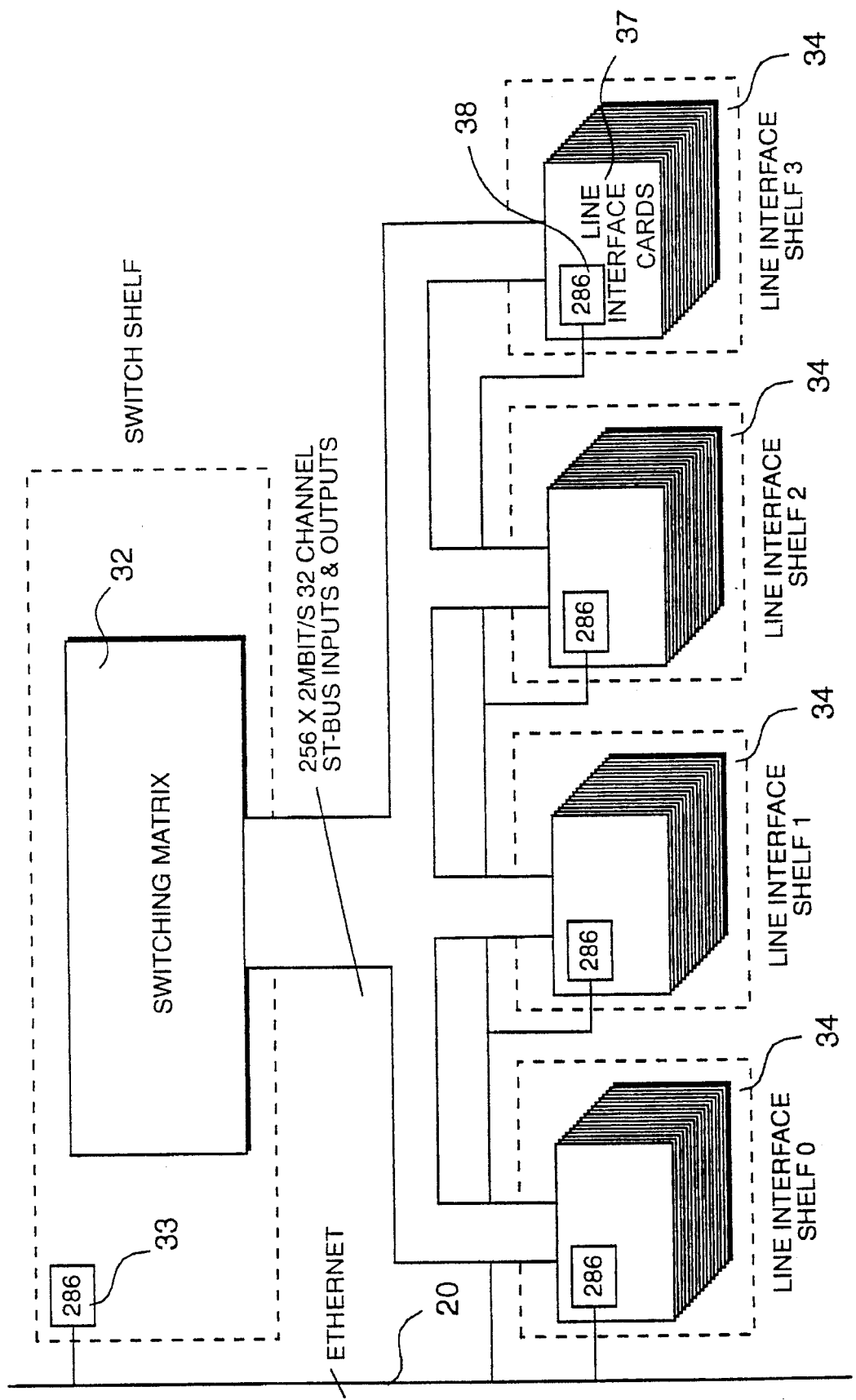
FIG. 3 details the switch shown in FIG. 2, including a switching matrix and a plurality of line interface cards.

Within the switch 25 two types of shelves are provided which are identified as line interface shelves and switching matrix shelves as shown in FIG. 3. In the preferred embodiment, switching matrix shelves and interface line shelves are duplicated so as to enhance reliability and a robust control computer, itself having duplicated shelves, preferably connected to the system, again enhancing overall reliability such that operation of the system is not dependent on a single card. Any of said cards may be removed while allowing the system to remain fully functional.

At the heart of the switch 25 is a non-blocking digital switching matrix configured from commercially available MITEL SMX/PAC chip sets. Switching matrix 32 receives 256 2 megabit per second coaxial pairs, conforming to the ST-BUS recommendation. Thus, each pair consists of a 32 channel multiplex for supplying information to the switching matrix 32 and a similar 32 channel multiplex for receiving information from said switching matrix 32. The switching matrix 32 is arranged such that any channel on any of said multiplexed lines may be switched to any other channel on any other of said multiplexed lines. Generally, said communications are bi-directional, such that the first of said pair is arranged to transmit data from location A to location B while the other pair provides communication in the opposite direction, from location B to location A. Furthermore, of the thirty-two channel 2 Mbit/s multiplex, thirty of the channels are used to convey audio data, and of the remaining two channels, one is used to convey signalling data relating to the thirty audio channels, while the remaining channel is used to provide frame synchronisation so that the position of each of the channels within the Lime multiplex may be determined by channel switching circuitry.

Switching matrix 32 is controlled by an Intel 80286 microprocessor based system identified generally by reference 33. This microprocessor based system 33 is configured to control the switching matrix 32 in response to commands received over the Ethernet line 20.

Signals transmitted through the switching matrix 33 conform to the ST-BUS recommendation and may be considered as 5 volt TTL compatible signals. Signals transmitted over lines 26 to the PSTN and other lines connected to the peripheral devices, do not conform to this recommendation and may effectively be considered as analogue-like signals, given the requirement for, in many situations, transmission over significant distances. Thus, before signals may be supplied to the switching matrix 32 and before signals emanating from said switching matrix may be supplied to the outside network, it is necessary to perform a conversion procedure, which is effected via line interface circuits.

The rack contains four line interface shelves identified in FIG. 3 by reference 34. Each line interface shelf may have a total of 16 line interface cards 37 and on each line interface card there is provided a resident Intel 80286 microprocessor system 38 and four bi-directional line interface circuits. Thus, within the four line interface shelves there is capacity for 256 bi-directional interface circuits.

In this example, customer originating signalling effected while calls are connected take the form of DTMF codes. Each DTMF code (dual tone multi-frequency) consists of two simultaneous tones, each selected from a different set of four possible tones. Thus, there are 4 ×4 permutations of two tones, providing a total of 16 different codes which the system may recognise. However, other modes of signalling may be employed consisting of audible signals of some form which may be detected by the system.

DTMF detection occurs on each line interface card under the control of the resident 286 computer system 38.

The nature of a particular DTMF detection will depend on the actual application being made during a particular call connection. The nature of DTMF codes required for particular applications are held by the control computer 24 and are accessible by systems operators. In addition to specific DTMF codes, it is possible to program the control computer 24 to detect simply logical combinations, such as ## followed by any of the numbers 1, 2 or 3 etc., as will be detailed subsequently. When a detection sequence of this type is required for a particular connection, it is necessary for the detection commands to be down-loaded to the respective line interface card. This is achieved over the Ethernet 20 and, initially, high level detection codes are supplied from the control computer 24 to the 286 microprocessor system 33 resident within the switch shelf. Switch shelf microprocessor system 33 is responsible for identifying a particular line interface circuit and after receiving such information from the control computer 24 over the Ethernet 20, the information is relayed to the respective 286 microprocessor system 38 resident on the respective line interface card. Thus, the transfer of DTMF detection programming from the control computer 24 to a line interface card 37 occurs in two steps, firstly from the control computer 24 to the switch shelf microprocessor system 33 and secondly from the shelf cell processor 33 to the respective line interface card microprocessor system 38. Thus, although it is possible for the control computer 24 to communicate directly with the line interface shelves, this is not done in practice as a hierarchical software structure exists whereby the control computer 24 communicates with the switch shelf microprocessor system 33, and the switch shelf microprocessor system 33 communicates with line interface card microprocessor system 38. Thus as far as the control computer 24 is concerned all transfers to the switch 25 may be considered as transfers to the switch shelf microprocessor system 33, thereby simplifying the way in which control computer 24 communicates with the switch 25.

Figure 4:
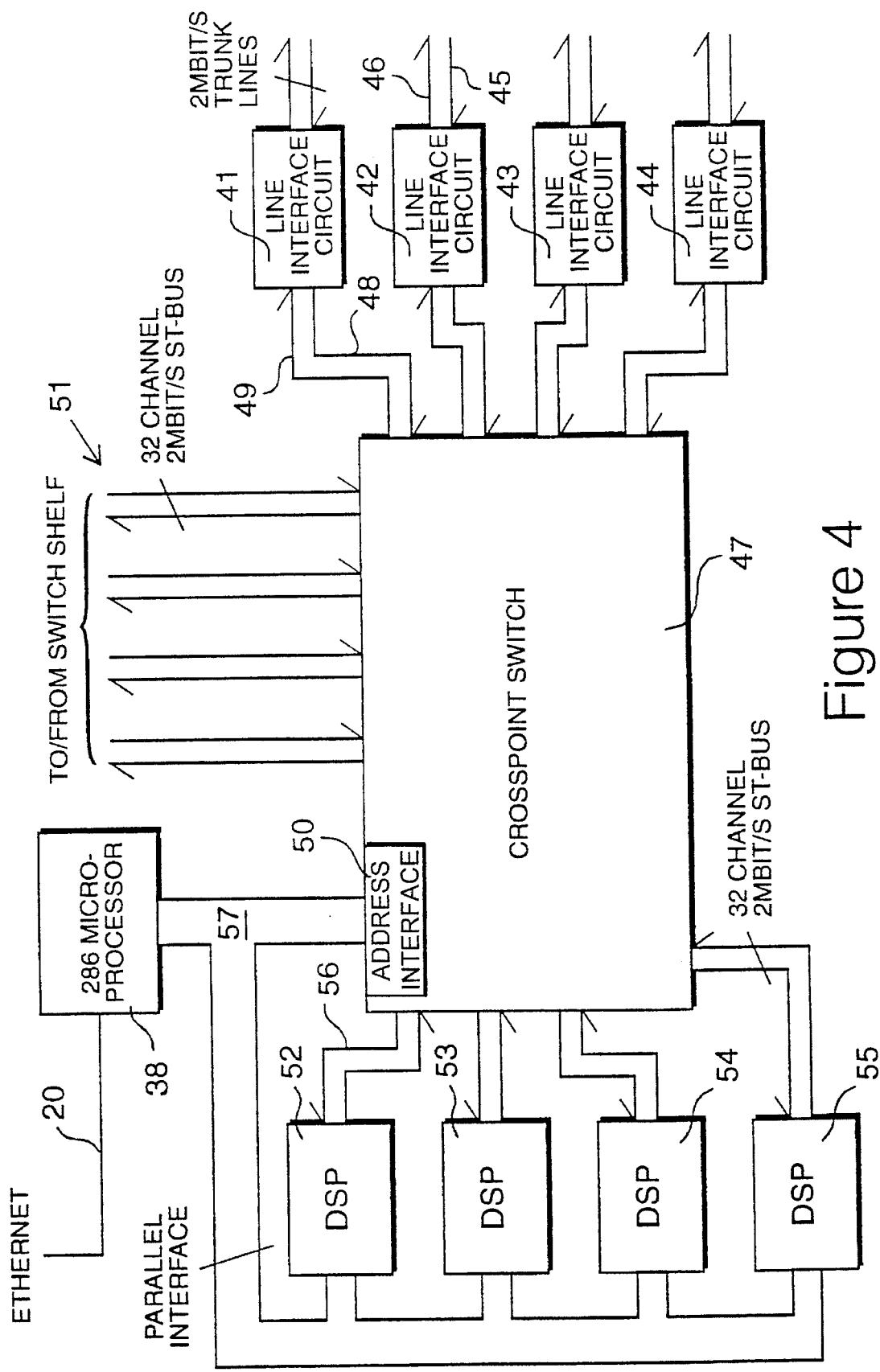
FIG. 4 details a line interface card shown in FIG. 3, including line interface circuits, digital signal processors, a microprocessor and a cross-point switch for connecting line interface circuits to digital signal processors.

A line interface card 37 is detailed in FIG. 4. The card includes 4 interface circuits 41, 42, 43 and 44, each connected to an input 2 megabit per second trunk line 45 and to an output 2 megabit per second trunk line 46. The line interface circuits are responsible for converting between transmission compatible signals and 32 channel 2 megabit per second ST-BUS signals which are supplied to and received from a cross-point switch 47, via 2 megabit per second input lines 48 and 2 megabit per second output lines 49.

The cross-point switch 47 consists of a Mitel SMX/PAC switch, similar to switching chips employed within the main switching matrix 32. However, it should be appreciated that the cross-point switch 47 does not effect switching on a call-by-call basis. The cross-point switch 47 is permanently configured during normal operation although said configuration may be modified to take account of upgrades and reconfigurations etc.

As shown in FIG. 3, the line interface board 37 includes a 286 microprocessor based system 38, connected to the Ethernet link 20. The address and data bus of the microprocessor system 38 is connected to the configuration inkerface 39 of the cross-point switch, such that said cross-point switch 47 is configured in response to configuration data supplied from the microprocessor based system 38, as is known in the art. Thus, in response to this configuration, each ST-BUS output and input line (48, 49) is connected to similar lines 51 on the switch shelf side of the cross-point switch 47. Thus, during normal operation, each channel supplied on an output line 48 from the line interface circuit from the cross-point switch, will be switched to a particular channel on a particular multiplex of the ST-BUS on the switching matrix side of the cross-point switch. Similarly, a parallel return path will be provided through the cross-point switch, thereby allowing all calls to be directed through line interface circuits, via cross-point switches resident on line interface cards 37, out to the main switching matrix 32 and then back to any selected line interface card via a further cross-point switch based on said interface card and out of the main switch 25 via a predetermined line interface circuit.

In addition to providing configuration codes for the cross-point switch 47, the 286 microprocessor based system 38 is also capable of observing any communication channel being passed through the cross-point switch 47 by applying suitable address codes to the address bus connected to interface 50.

In addition to connecting interface circuit side channels to switch shelf side channels, the cross-point switch 47 may also connect each input line 48 from the line interface circuits 41 to 44 to a respective digital signal processor 52, 53, 54 and 55. Thus, the cross-point switch 47 may be configured such that the input multiplex 48 from line interface circuit 41 is connected to an output multiplex 56 supplied to a digital signal processor 52, with similar connections being made to the other three signal processors.

Each digital signal processor 52 to 55 is a TMS320C31 device produced by Texas Instruments and is programmed to be able to detect DTMF codes on each of the 30 audio channels present on the 32 channel input multiplex 56.

It will be appreciated that signals conveyed through the cross-point switch 47, along with signals conveyed through the main switching matrix 32, are conveyed in digital form. The 2 megabit per second ST-BUS is arranged to convey 32 time multiplexed channels. Thus, each channel has an identifiable time slot within each frame and during this time slot 8 bits of data may be transmitted. Thus, when transmitting conventional speech signals, each of these 8 bit words convey a digital representation of an audio sample.

The digital signal processors 52 to 55 receive information in the ST-BUS format and produce an output in similar format. However, the output from each DSP does not represent an audio signal but represents an indication of information contained within an audio signal; in particular, the presence and identification of DTMF tones. Thus, in the previously suggested configuration, DSP 52 examines 30 speech channels received via line interface circuit 41, while said channels are being supplied to the switching matrix 32 via the switch side communication buses 51. The digital signal processor 52 is programmed to effectively convert signals received in the time domain into frequency domain signals, and then to provide an indication when these frequency domain signals correspond to recognised DTMF tones. Thus, the digital signal processors produce outputs indicating the presence of DTMF codes.

A DTMF signal may take one of sixteen states, therefore four output bits are produced by a DSP for each audio channel in order to identify a particular DTMF detected code. In addition to this, a further bit is used to provide a valid code detected signal and the microprocessor 38 is arranged to examine these five bits of data provided by each DSP on each of the 30 channels examined by each DSP.

Thus, during communication, a customer using a channel supplied to line interface circuit 41 may depress a key resulting in a DTMF signal being supplied over this channel. The audio signal may convey audio information in addition to the DTMF code, but by implementing a Fourier transform on each of the thirty audio channels supplied to each of the DSPs, it is possible to detect the presence of the recognisable DTMF tones and successfully return this information to the microprocessor system 38. Thus, when the DTMF tone code is generated, the DSP 52 detects the presence of this DTMF tone and returns the relevant four bit representation to the cross-point switch 47 on a respective channel associated with the particular channel being supplied via the line interface circuit 41. The DSP generates the five bit DTMF recognition signal throughout the time that the DTMF tone is being recognised.

Generally a DTMF tone must be present over a period of time before it is considered valid by the system, so that spurious noise signals or speech cannot wrongly trigger recognition of a DTMF code. Thus the DSP 52 will pause after recognising a DTMF tone combination, for long enough to ensure that it has been deliberately intended. Thereafter the DSP 52 generates the five bit recognition code once for each corresponding audio sample, and supplies it to the cross-point switch 47. Thus, when a tone is correctly recognised by a DSP, there will be a period of time during which the recognition signal is continuously generated. Within this time period the microprocessor 38 must interrogate the cross-point switch to capture DTMF recognition signals as they occur in real time.

A successful recognition of a DTMF tone by a DSP will result in the five bit signal being generated for a minimum period of 32 milliseconds. Thus, in order to ensure successful capture of all recognised DTMF codes, the microprocessor must sample a DSP output channel once every 16 milliseconds. In order to successfully capture DTMF recognition for any of the thirty channels connected to a DSP, all thirty must be sampled within the 16 millisecond time frame. Thus, in order to ensure reliable capture of all DTMF recognitions within the line interface card, the microprocessor 38 must sample all 120 audio channels within each 16 millisecond time frame; and this represents a substantial computational requirement of the microprocessor 38.

Figure 5:
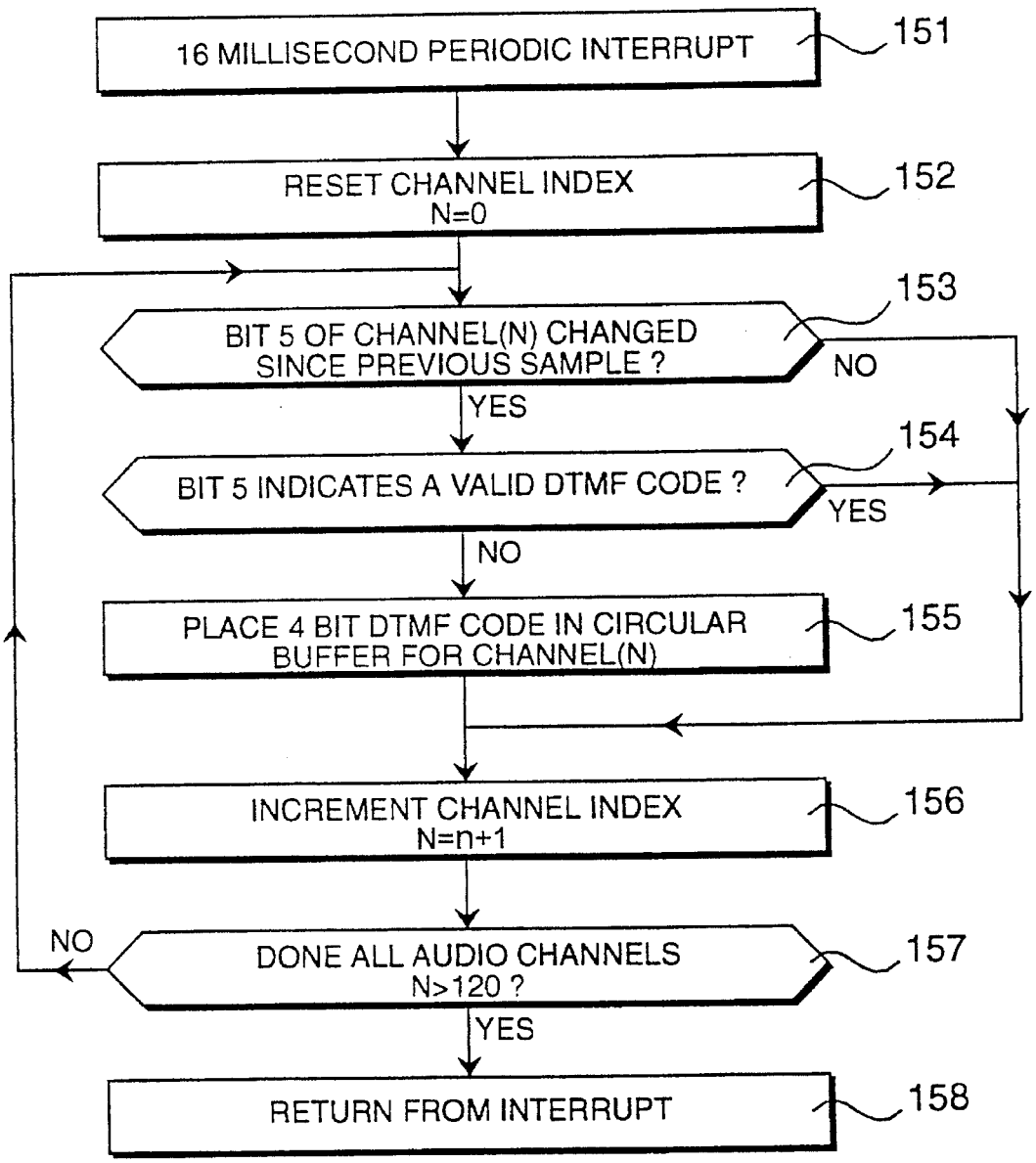
FIG. 5 details operations performed on the line interface card shown in FIG. 4.

In the preferred embodiment, each sample of an output channel from a DSP is placed into a circular buffer according to the rules defined in the flowchart shown in FIG. 5. Thus, although the intensive task of sampling all the audio channels is performed at the required rate, the processing of the resulting data may be performed over a longer time period by more complex software. The flowchart in FIG. 5 details the operations of an interrupt routine running on the microprocessor 38 which is called at sixteen millisecond intervals. Thus, regardless of whatever functions the microprocessor is otherwise doing, this routine will be called every sixteen milliseconds.

Step 151 signifies the generation of the sixteen millisecond periodic interrupt, which will force the microprocessor 38 to suspend other operations and execute the interrupt routine. At step 152 the channel index N is reset to zero. The channel index will be used subsequently to define access to a particular channel within the cross-point switch 47 which is used to convey data from a channel output from a DSP. The channel index is also used to access the circular buffer and other memory locations within the 286 microprocessor system 38 which are associated with a particular audio channel.

At step 153 bit 5, the validation bit, of channel(N) is compared with its previously recorded value to see if it has changed. If bit five is unchanged, the other four bits of the DTMF recognition code are either valid or invalid. Either way, no actions needs to be taken for the current channel. However, if bit five has changed, step 154 decides whether bit five indicates a valid or an invalid signal. If bit five indicates an invalid signal, a valid recognised DTMF tone has just ended and step 155 may place the previously valid four bit DTMF recognition code into a circular buffer for the current channel. In other words, valid DTMF tones are only recorded by the microprocessor 38 at the end of their duration. A circular buffer is one where a number of memory locations, for example 64, is indexed by a counter which automatically increments every time a data item is written into the location which is indexed by it. The counter has the property that only a pre-defined number of bits are used for the index, so that incrementing the counter beyond 63 is impossible. Thus, computational overhead and memory are saved. The disadvantage is that another counter must be used to read out values from data locations within the buffer before it is overtaken by the buffer input counter. A suitable size for the circular buffer may be defined, such that, given a set of reasonable operating conditions, it is extremely unlikely for this to happen.

In the event that step 154 decides that bit five indicates the presence of a valid tone, no significant action need be taken.

Step 156 increments the channel index N to n+1 where n is the previous channel processed, so that the steps 153, 154 and 155 may operate similarly on data associated with the next channel. Before doing so, however, step 157 ensures that there are still audio channels to be processed. If there are some left (N is less than 120) control is returned to step 153. If all 120 audio channels have been sampled, control is returned to the process which was being executed at the time the interrupt was called.

The interrupt routine shown in FIG. 5 represents a highly efficient way of sampling, interrogating and storing DTMF recognition codes from a large number of channels in real time using a microprocessor 38.

Once DTMF codes have been stored in circular buffers, the microprocessor 38 may analyze the stored codes to see if the pattern of codes meets conditions defined by a scan pattern. Thus the microprocessor 38 on the line interface card is able to record and match DTMF patterns against a scan pattern provided to it by the microprocessor 33 in the switch shelf, which has received the scan pattern and associated control instructions from the control computer 24. Furthermore, the scan pattern may specify a range of possible conditions, so that the microprocessor 38 may recognise a variety of incoming DTMF code patterns as meeting the required conditions, rather than simply searching for an identical match between a pattern and incoming DTMF codes. Thus a limited form of pattern recognition may be performed by the line interface card processor 38.

Figure 6:
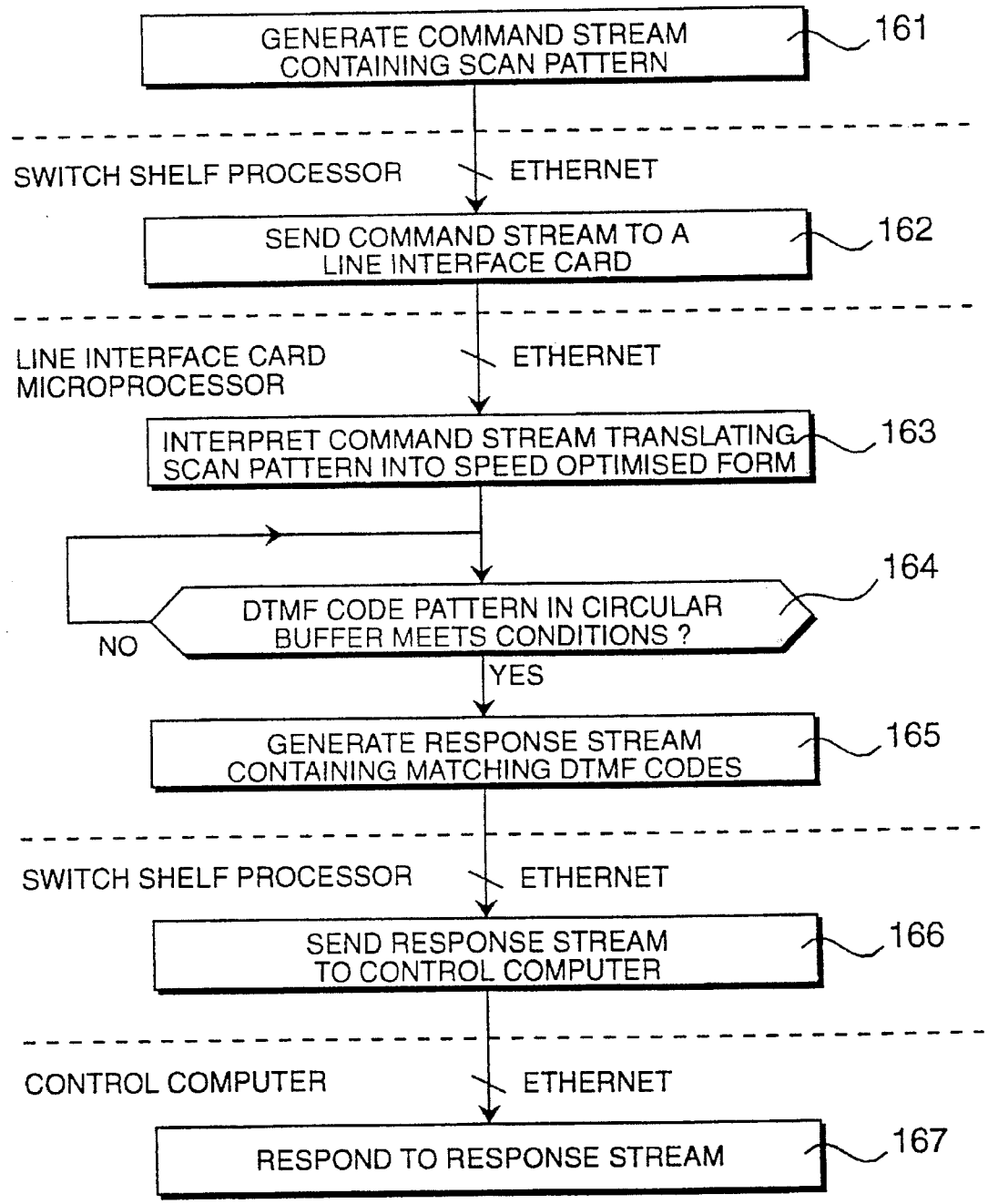
FIG. 6 details control operations for the service node.

The procedure shown in FIG. 6 outlines the operations performed in different parts of the service node in order to set up and respond to a DTMF scan pattern. At step 161 the control computer generates a command stream for a particular customer call. The command stream includes the scan pattern, which is an embedded string of characters. These characters define the set of conditions which an incoming DTMF sequence from the customer must satisfy before said sequence is considered to match a particular pattern. The format of the scan pattern is described later. The command stream is passed over the ethernet interface to the switch shelf microprocessor 33. At step 162 the switch shelf microprocessor 33 redirects the command stream, again over the ethernet, to a line interface card.

At step 163 the line interface card microprocessor 38 interprets the command, deriving signalling information such as the channel number from the command stream.

Also at step 163 the microprocessor 38 translates the scan string into a different format in order to provide maximum speed efficiency during the process of attempting to match a DTMF code sequence, which occurs at step 164. At step 164, the DTMF codes stored in the circular buffer associated with the customers channel are compared with the speed-efficient scan pattern to determine whether the conditions are met. If these conditions are not met, step 164 loops back to its beginning again.

When a DTMF sequence in the circular buffer matches a scan pattern, control is diverted to step 165, where the line card microprocessor 38 generates a response stream, including the matching DTMF sequence. The response stream is sent over the Ethernet 20 to the switch shelf microprocessor 33, which at step 166 directs the response stream to the control computer 24 over the Ethernet. At step 167 the control computer uses the information contained in the response stream to direct further actions that are required to complete the customer service.

The control computer 24, having sent a command stream to the switch shelf, may return to other tasks until the remote processors send back a positive response stream. Thus, sophisticated DTMF pattern matching is provided without the danger of computational resources being overwhelmed by a coincidence of numbers of callers requiring a similar service at the same time.

As described previously, the control computer sends a command stream containing a scan pattern defining the conditions for a positive match. This scan pattern is a string of characters in a relatively legible format to aid service software writing and debugging. The format includes specifiers, and is defined in the following way:

A constant specifier may be used to define specific matching characters. A constant specifier may be 0 through 9, A through D, # or *. An example of this is "##22", which requires a customer generated DTMF sequence of "##22" to achieve a positive match—it must be identical.

An equal specifier defines that the DTMF incoming character must be the same as the one which preceded it. For example "#=2=" requires "##22".

A variable specifier follows the form %{n.{m}}p. Where p is one of "a", "n", "m" or "[digits]".

"a" specifies any DTMF digit.

"n" specifies any numeric DTMF digit 0–9.

"m" specifies any numeric digits terminated by #.

"[digits]" specifies any DTMF digit in the string "digits", except when the first character is a ^, in which case it specifies any DTMF digit except those in the rest of the string.

The optional value n (as in %{n.{m}}p.) can be used to specify detection of a fixed number of digits. If only n is specified as the template string, a match is always made on entry of the nth DTMF digit by the caller. The optional value m (as in %{n.{m}}p.) can be used to specify a maximum number of DTMF digits to be input by the customer.

For example "%5m" is matched if an input of 5 numeric digits terminated by a "#" are detected.

"%3.5m" is matched if an input of 3 to 5 numeric DTMF digits terminated by a "#" are detected.

"%[123]" is matched if a single DTMF digit "1", "2" or "3" is detected.

"#=%[123]=" is matched by the patterns "##11", "##22" or "##33".

In addition to the above methods of specification, a logical OR character (¦) may be used to specify a plurality of matching conditions, such that only one of the conditions contained within the string need be met to achieve a positive match. This character is represented on some computers as a single horizontal line (without the usual embellishments associated with letter I or numeral 1), shown herein as "¦" and has the ASCII value 124.

Thus using the logical OR character a template definition may be constructed thus:

"=%1[123]=¦*%1[12345]¦%10.20m¦%1[^0]"

which enables the customer to generate one of four different possible types of response. Whichever response the customer generates will be passed back to the control computer in the response stream, and thus the control computer 24 may initiate one of four different possible responses to the customer's DTMF sequence. In this way an intelligent dialogue may be built up with the caller, so that the caller may navigate through a menu driven service.

In the command string generated by the control computer, variables and flags are provided to define various aspects of the process of DTMF pattern recognition. Two variables, known as "first_dig_to" and "inter dig_to", define the maximum time before a first digit is received and the maximum time between subsequent digits respectively. When inter_dig$_{13}$ to is exceeded, the DTMF codes may be successfully matched against scan patterns defining a "#" as the last digit, even if this has not been provided by the caller. When first_dig_to is exceeded, the operation is defined by the CONTINUOUS_SCAN flag defined below. The flags included in the command string are:

CLEAR_BUFFER—Causes any previously detected but unchecked DTMF digits to be discarded on initiation of additional pattern recognitions.

FIRST_DIGIT NOTIFY—Causes the line card interface microprocessor 38 to generate a response stream on receipt of the first DTMF digit code after a pattern recognition has been initiated.

CONTINUOUS SCAN—Causes the operation to restart automatically either after a successful pattern match, or after the time out defined by the "first_dig_to" has been exceeded.

Thus a command stream for initiating a DTMF pattern recognition includes a template specification string, variables and flags, and associated channel, and service identification data. A response stream from the line interface card microprocessor 38 assigned the task will include the actual DTMF codes matching the scan string, and associated channel and service identification data, so that the control processor may associate the response stream with the original command string and a particular service for a particular connected caller.

The design of a line interface card such as that shown in FIG. 4 requires that careful attention be paid to the amount of circuitry required to implement all the functions that are shown. In particular the number of separate integrated circuits required to connect the various elements of the circuit to each other must be minimised without sacrificing functionality, in order that the line interface card may fit on a single circuit board.

Where elements of the circuit are duplicated several times, for example line interface circuit 41, or the circuitry associated with each of the four digital signal processors 52–54, it is particular advantageous to reduce the complexity as the savings are multiplied by the number of times such circuits are used on a line interface card.

As stated previously, each of the digital signal processors 52–55 is a TMS320C31 manufactured by Texas Instruments, additionally it should be noted that the particular TMS320C31 chip that is used in the line interface card runs at a clock speed of 33 megahertz, which is necessary to ensure that the function of DTMF recognition may be performed on 30 channels simultaneously by each DSP.

Each TMS320C31 digital signal processor includes a program memory and data memory on the same chip die as the main digital signalling processing components. Thus it is possible to have a DSP which is capable of implementing useful functions such as DTMF recognition while the usual elements of a DSP circuit such as additional RAM and/or ROM integrated circuits may be omitted. Thus, each of the DSPs used in the line interface card requires very little additional logic in order to perform useful processing operations.

Figure 7:
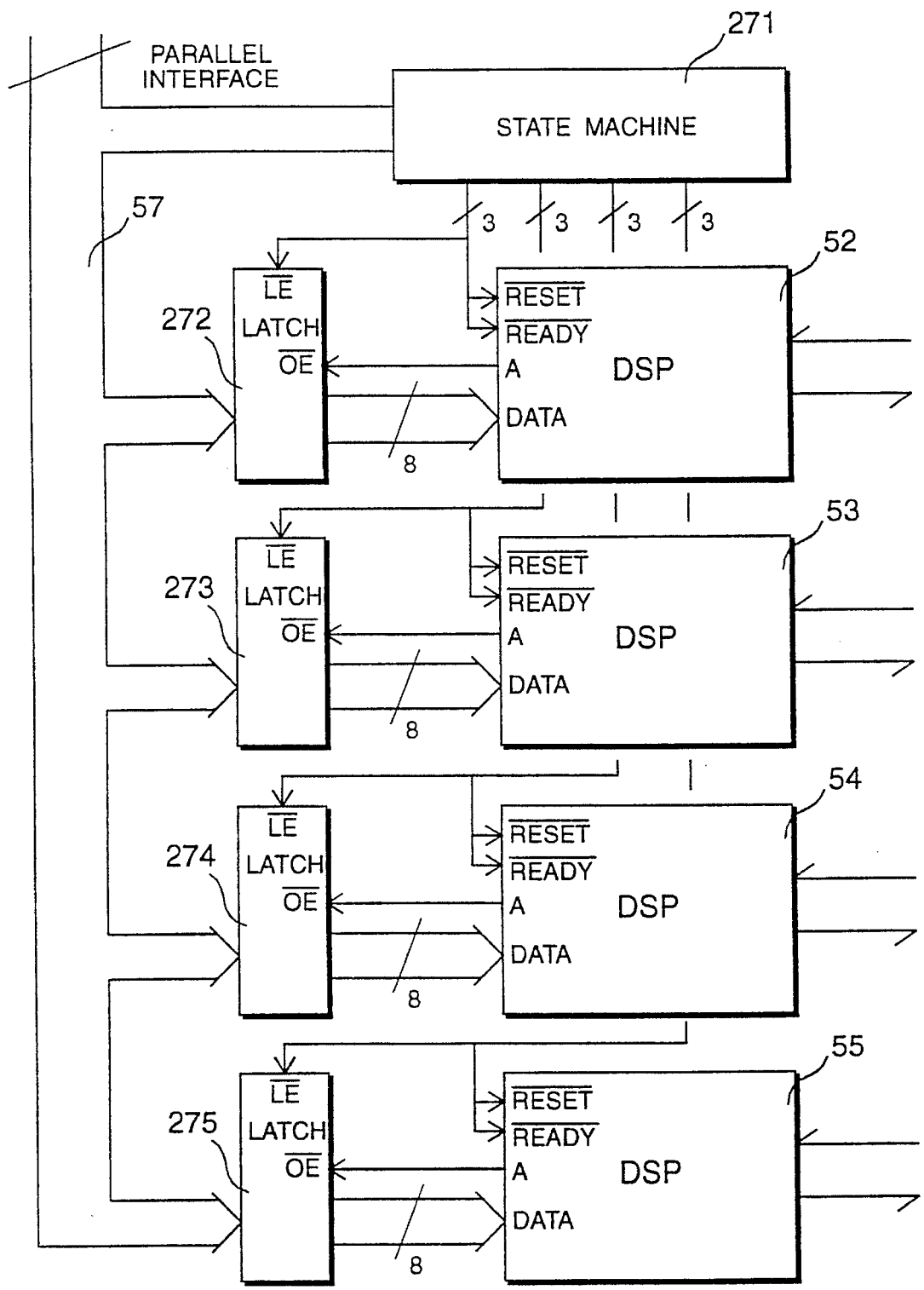
FIG. 7 details the connections between the digital signal processors and the microprocessor shown in FIG. 4.

The serial interface 56 for connecting a DSP to the cross-point switch 47 requires no additional interfacing logic. The parallel interface 57 connecting the microprocessor 38 to the cross-point switch 47 and to each of the DSPs 52–55 is also used for downloading program data into each of the DSPs. Unlike the serial interface the parallel interface to the DSPs requires a certain amount of interface circuitry. In FIG. 7 interface circuitry is shown for all four of the digital signal processors 52 to 55 so that programs may be downloaded from the microprocessor 38 over the parallel interface 57 to the digital signal processors.

The TMS320C31 digital signal processor used in the line interface cards typically loads programs from an external read-only memory after receiving a reset signal. In this circuit, for each of the digital signal processors, a latch is provided in order to simulate the characteristics of an external read-only memory supplying a program to the digital signal processor. Four latches 272–275, are provided for supplying program data to each of the DSPs 52–55. In order to simulate the operation of an external read-only memory a state machine 271 translates control signals provided by the microprocessor 38 into control signals for each of the digital signal processors, in order to ensure that the characteristics of a read-only memory, including time-critical control sequences, may be simulated correctly. The state machine provides three control lines for each of the digital signal processors. The sequence of events for downloading a program to a digital signal processor 52 will now be described.

Each of the three control lines provided by the state machine 271 to the digital signal processor 52 and its associated latch 272 are generated in response to accessing memory mapped locations in the memory area of the microprocessor 38. When a program is to be downloaded to a DSP, the DSP must be reset by an application of a 0 volt logic level to the reset pin of the digital signal processor 52. The reset signal is held at the 0 volt level for a period of several milliseconds in order to ensure that a full chip reset has been achieved. After this period of time the reset signal will be allowed to return to its previous level of 5 volts, resulting in the digital signal processor performing a bootstrap operation. The bootstrap operation consists of running a short section of bootstrap code which is stored as read-only memory on the digital signal processor's chip die. The bootstrap program contains instructions for the digital signal processor to fetch data from an external memory for storage on random access memory on the digital signal processing chip. In this way a program for the digital signal processor is downloaded.

The bootstrap program operating on the digital signal processor performs operations of accessing sequential external memory locations and transferring data from these locations into the internal memory of the DSP. Thus it is necessary for the state machine 271 and the microprocessor 38 to coordinate downloading of data such that characteristics of an external read-only memory are simulated.

The microprocessor 38 provides data over its parallel interface to the latch 272 while the latch's latch enable line (LE) is set at zero volts. Shortly thereafter the latch enable line will return to 5 volts and the data originally present at the latch's input will remain stable on the latch's output, thus providing a stable 8 data byte for the digital signal processor. During this time the ready input to the digital signal processor will have been held at a level of +5 volts, indicating to the digital signal processor that external memory is not yet available for access, resulting in suspension of access by the bootstrap program to the current memory location it is looking at. Once the latch data has stabilised the state machine automatically releases the ready line setting it to 0 volts, thus indicating to the digital signal processor that external memory is available for access, resulting in execution of the bootstrap program being allowed to continue. Shortly thereafter the state machine will set the ready line to +5 volts once again so that the next data byte may be supplied to the latch 272.

In this way communication between the microprocessor 38 and the digital signal processor 52 over the parallel interface 57 is coordinated in order to simulate the characteristics of a ROM which would be used for bootstrapping digital signal processing software.

The state machine 271 provides memory mapping of the coordinating signal lines for each of the digital signal processors so that any of the digital signal processors 52–55 may be individually reset and have new software downloaded at any time.

Referring once again to FIG. 4, it can be seen that the arrangement of the four digital signal processors 52–55 connected to the cross-point switch 47 and the microprocessor 38, provide an extremely flexible topology which may be used for implementing functions other than DTMF recognition. In particular, because each of the digital signal processors may be reset and bootstrapped independently it is possible to configure one of the DSPs to perform a different task while the other three are still operating. One example of an alternative use for a digital signal processor is conference bridging.

In conference bridging three or more callers are connected so that all three may speak to each other as if in the same room. It should be noted that it is not possible to implement conference bridging without the use of some form of digital signal processing.

In the minimal conference bridge configuration three callers require to speak to each other thus generating six signals which must be combined in some way. Caller A receives an incoming signal RXA, and generates an outgoing signal TXA; caller B receives incoming RXB, and generates outgoing signal TXB and caller C receives incoming signal RXC and generates outgoing signal TXC. In a digital exchange samples of audio signals are stored as 8 bit numbers. In order to achieve a high signal quality the 8 bit samples are encoded using a non-linear function, known as A-law. Thus the digital audio samples passing through the cross-point switch 47 are stored in a non-linear format, and must be converted into a linear format before conference bridging can be performed. The first step in a conference bridge is conversion of each of the three outgoing signals TXA, TXB and TXC from A-law form into linear form. This is done by means of a look-up table algorithm operating as part of the DSP conference bridge program. Once linearised the three incoming signals RXA, RXB and RXC may be calculated as follows:

RXA=TXB+TXC

RXB=TXA+TXC

RXC=TXA+TXB

The final step in generating the conference bridge is to translate the three incoming signals RXA, RXB and RXC into a non-linear form as is standard on the network. Thus each of the three signals RXA, RXB, RXC is translated by a look-up table algorithm into the non-linear A-law form. A program to perform all the above operations described for conference bridging may be executed on a digital signal processor 52 while the other digital signal processors 53 to 55 are performing DTMF recognition or other different operations.

As noted in the conference bridging example, digital telephone signals for audio are conveyed in a non-linear format. Two different non-linear formats exist: in Europe A-law is used, while in the United States Mu-law is used. Thus when communicating between two different telecommunication networks where different non-linear formats are used, it is necessary to convert Mu-law to A-law and vice versa when a two-way conversation is required. This may be performed on a digital signal processor by using a look-up table which converts directly from A-law to Mu-law and another look-up table which converts directly from Mu-law to A-law. This process may be done very quickly. However, a digital signal processor may be a convenient way of implementing this, especially when the digital signal processor forms part of a reconfigurable circuit where the digital signal processor is not dedicated to performing that task, and may be reconfigured to perform other operations when Mu-law to A-law conversion is not required.

Since four digital signal processors are provided in the line interface card these may take account of dynamic customer requirements so that at certain times of the day, for example during business hours, two digital signal processors may be configured to perform Mu-law to A-law conversion while the other two are configured to perform DTMF recognition, and reconfiguration to a number of different tasks may be performed as conditions dictate.

I claim:

1. A service node switching apparatus for routing channels within a service node, comprising a switching matrix and a plurality of line interface means, wherein each of said line interface means includes:

a cross-point switch, a first type of processing means and a second type of processing means, wherein;

said first type of processing means is connected to said cross-point switch by a first type of interface means, said second type of processing means is connected to said cross-point switch by a second type of interface means, and said cross-point switch includes a first set of ports for coupling to a plurality Of communications lines, a second set of ports coupled to said first type of processing means via said first type of interface means and further includes means for facilitating a communication between said first type of interface means and said second type of interface means.

2. Switching apparatus according to claim 1, wherein said cross-point switch includes means allowing said switch to be configured by one of said processing means.

3. Switching apparatus according to claim 2, wherein said cross-point switch is configurable by said second type of processing means via said second interface means.

4. Switching apparatus according to claim 1, wherein said first type of processing means is programmed by said second type of processing means.

5. Switching apparatus according to claim 4, wherein said first type of processing means is further connected to said second type of processing means to receive a program directly from said second type of processing means, thereby avoiding said cross-point switch.

6. Switching apparatus according to claim 5, wherein said second type of processing means is arranged to download programs to said first type of processing means directly by using first predetermined addressing signals.

7. Switching apparatus according to claim 6, wherein said second type of processing means downloads programs to said first type of processing means via respective latching means.

8. Switching apparatus according to claim 7, wherein said latching means are enabled by decoding means connected between said second type of interface means and said latching means.

9. Switching apparatus according to claim 1, wherein said second type of processing means communicates with said first type of processing means via said cross-point switch, by using second predetermined addressing signals.

10. Switching apparatus according to claim 1, wherein said first type of processing means are digital signal processors.

11. Switching apparatus according to claim 1, wherein said first type of processing means detects signals present in external communication channels and said second type of processing means supplies information derived from the signals detected by said first type of processing means to a central control processing means.

12. A method of processing signals in a line interface card for a service node switch, comprising the steps of:

supplying program instructions to a first type of processing means from a second type of processing means via a first type of interface; and communicating data between said first type of processing means and said second type of processing means via a cross-point switch wherein said first type of processing means communicates with said cross-point switch over a second interface and said second type of processing means communicates with said cross-point switch via said first interface.

13. A method according to claim 12, wherein said cross-point switch is configured by one of said processing means.

14. A method according to claim 13, wherein said cross-point switch is configured by said second type of processing means via said second interface means.

15. A method according to any of claim 12, wherein the first type of processing means is programmed by said second type of processing means.

16. A method according to claim 15, wherein the first type of processing means receives a program directly from the second type of processing means, thereby avoiding the cross-point switch.

17. A method according to claim 16, wherein programs are downloaded to the first type of processing means directly by using first predetermined addressing signals.

18. A method according to claim 17, wherein the second type of processing means downloads programs to said first type of processing means via respective latching means.

19. A method according to claim 18, wherein the latching means are enabled by decoding means connected between the second type of interface means and the latching means.

20. A method according to any of claim 12, wherein the second type of processing means communicates with the first type of processing means via the cross-point switch, using second predetermined addressing signals.

* * * * *